Feb. 12, 1957 A. J. HAYNES ET AL 2,780,937
WIND DIRECTION AND VELOCITY INDICATOR
Filed July 1, 1954 2 Sheets-Sheet 2

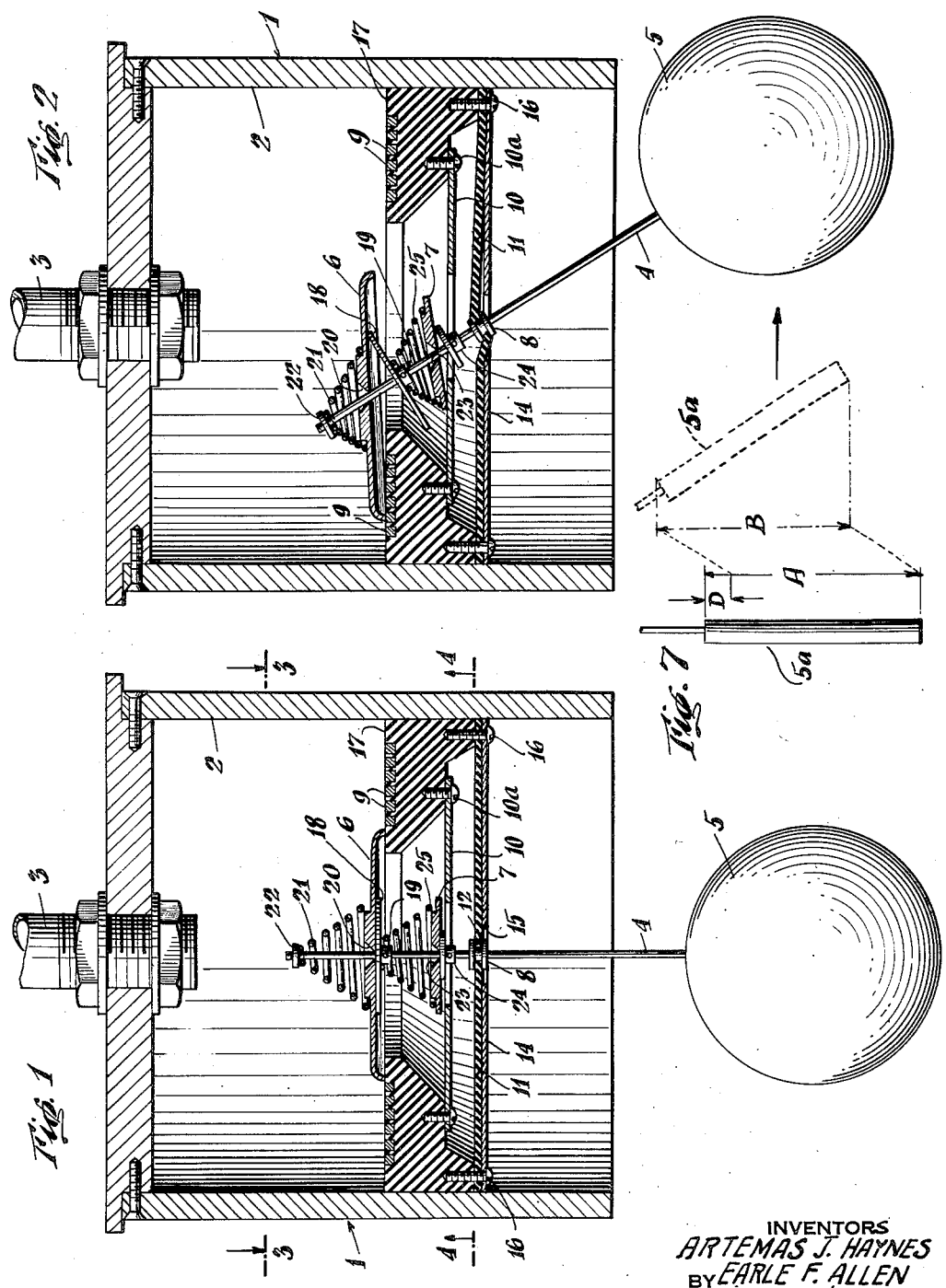

INVENTORS
ARTEMAS J. HAYNES
BY EARLE F. ALLEN
ATTORNEY

United States Patent Office 2,780,937
Patented Feb. 12, 1957

2,780,937

WIND DIRECTION AND VELOCITY INDICATOR

Artemas J. Haynes, South Yarmouth, and Earle F. Allen, Norwell, Mass., assignors to Valentine E. Macy, Jr., New York, N. Y.

Application July 1, 1954, Serial No. 440,810

8 Claims. (Cl. 73—189)

The present invention relates to a wind direction and velocity indicator. The invention is particularly directed to an electrical indicator which is efficient and reliable due to its novel mechanical design which minimizes contact wear and allows the contacts to be completely sealed from dirt and moisture and to its high voltage and low current electrical system which eliminates contact sparking and pitting.

Known types of electrical wind indicators are subject to contact troubles such as sparking, pitting and wear due to the high current, high pressure type contacts used or else avoid contacts altogether and employ more complex and expensive indicating means such as dynamometers or selsyns.

An object of this invention is to provide an improved wind direction and velocity indicator.

Another object of the invention is to provide a reliable and simplified wind direction and velocity indicator.

Another object of the invention is to provide an indicator whose sensing elements are easily sealed from dirt and moisture.

Another object of the invention is to provide an indicator using extremely low currents to prevent contact sparking and pitting.

Another object of the invention is to provide an indicator having low pressure, long wearing electrical contacts.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

Fig. 1 is a side elevational view in section of the sensing element of the wind direction and velocity indicator;

Fig. 2 is a side elevational view in section of the element of Fig. 1 acted upon by a wind force;

Fig. 7 is a front elevational view of another form of the wind vane.

Figure 3:
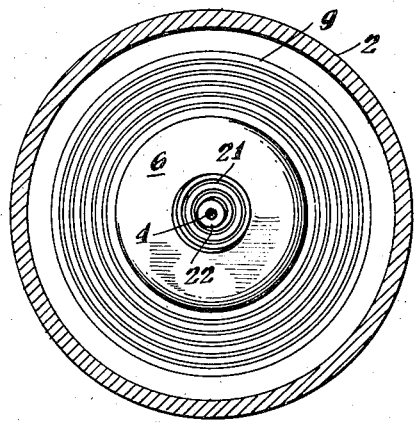
Fig. 3 is a sectional view taken along the line 3—3 of Fig. 1.

The wind indicator will first be described generally with particular reference to Figs. 1 and 6. Fig. 1 shows a cross section of the sensing element 1 which is mounted on a roof or tower or other exposed location so that a vane or ball member 5 is moved in accordance with the wind direction and velocity. The sensing element 1 comprises an enclosure 2 which is suspended from a hanger 3 in the desired location. Enclosure 2 preferably has a rounded cross section, as shown in Fig. 3, so that it has a minimum effect on the wind flow pattern. A rod 4 is mounted in a vertical position within hollow enclosure 2 by a pivot mounting 8 so that it will be tipped by ball 5 mounted on its lower end in a direction corresponding to the wind direction and an amount proportional to the wind velocity.

Figure 5:
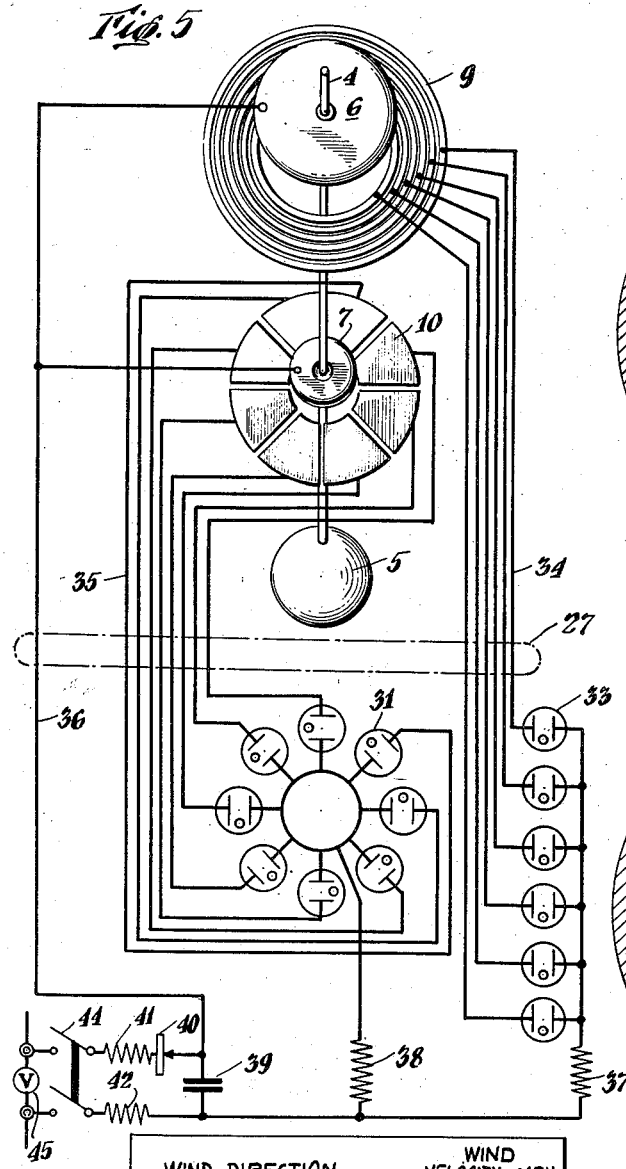
Fig. 5 is a diagrammatic view of the wind indicator showing the wiring between the sensing and the indicating elements.
Figure 4:
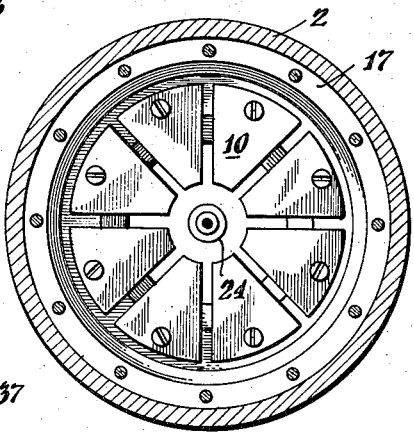
Fig. 4 is a sectional view taken along the line 4—4 of Fig. 1.

Two electrical contactor disks or brushes 6 and 7 are mounted near the top of rod 4 in a floating manner to be more fully described below. These disks are tipped and also moved in a generally horizontal direction as seen in Fig. 2 when rod 4 is tipped by the wind force on ball 5. The upper disk 6 is moved a horizontal distance proportional to the wind velocity and it contacts one of a series of concentrically spaced contact rings 9 (Fig. 3) to close an electrical circuit associated with the ring. The circuit when closed lights an appropriately labeled velocity indicator lamp 33 on panel 29 of indicator element 28 (Fig. 6). The lower disk 7 is tipped into contact with one of a series of radially oriented contact segments 10 (Fig. 4) surrounding rod 4. This closes a second circuit which similarly lights a direction indicator lamp 31 on indicator element 28. The indicator element is mounted in a convenient viewing location and is electrically connected to the sensing element by a suitable cable 27 (Fig. 5).

The sensing element 1, the electrical circuits and the associated indicator element 28 will now be described in greater detail.

*Sensing element*

The sensing element 1 is mounted in a location exposed to the wind such as upon a roof, tower or pole. The element comprises a box-like enclosure 2 suspended from a suitable hanger 3 so that ball 5 is free to swing on rod 4 under the influence of the wind passing beneath enclosure 2. The vertical rod 4 is attached to the box at a single pivot point 8 so that it is free to tip under the influence of the wind on ball 5. A preferred form of mounting for rod 4 is shown in Figs. 1 and 2. A flexible rubber diaphragm 11 is placed within the lower end of enclosure 2 to mount rod 4. Diaphragm 11 is attached to rod 4 by a collar 8 through which rod 4 passes and which has flanges 12 for gripping the diaphragm 11. A rigid plate 14 fitted into the end of enclosure 2 and having a center perforation 15 supports the outer portions of diaphragm 11 and holds its edges in place against ring-like support member 17. Screws 16 hold plate 14 in place against support 17. When the wind tips rod 4 to a position such as that shown in Fig. 2, diaphragm 11 bends and stretches to allow pivot collar 8 freedom of motion. Since collar 8 is fitted tightly about rod 4 and onto diaphragm 11 and since plate 14 forms a tight seal at the edges of the diaphragm 11, it is seen that even though rod 4 is supported so that it may tip freely, enclosure 2 is sealed against dirt and moisture.

Contact disks 6 and 7 are mounted in floating fashion on the upper portion of rod 4 so that they will tip slightly and slide outwardly over rings 9 and segments 10, respectively, as rod 4 tips. Disk 6 is mounted by first fastening a fixed disk 18 on rod 4 by set screw 19. Circular disk 6 having a perforation 20 at its center is slid over rod 4 so that it rests on disk 18. A helical spring 21 fitted over the top of disk 6 and held in place by nut 22 resiliently holds disk 6 in place. Perforation 20 preferably has outwardly sloping sides as seen in Fig. 1 or a loose fit on rod 4 to allow disk 6 to tilt easily with respect to rod 4 when the rod tips as shown in Fig. 2 under the influence of the wind. The radial spacing of rings 9 is set to correspond to steps of wind velocity in accordance with the tilt of rod 4. The embodiment shown in the drawing has six rings spaced to indicate six readings between wind velocities of five to over sixty miles per hour, as shown in Fig. 6. Other spacing and different intervals may be used for different wind velocities as desired.

Disk 7 is similarly mounted between a fixed disk 24 and a helical spring 25 which is compressed between disk 7 and disk 18. Disk 7 is tipped into contact with one of the segments 10 (Fig. 4) in accordance with the direction in which the wind tips rod 4. Segments 10 are fastened around the edge of support 17 by screws 10a. Support 17 is made of an electrical insulating material so that segments 10 are isolated from one another. Although eight segments 10 are shown in the illustrated embodiment, more or less may be used in accordance with the sensitivity of wind direction indication desired.

As will be more completely described below, each of rings 9 and segments 10 are connected to an appropriately labeled indicator lamp at a remote indicator element 28.

The rod 4 is urged towards its vertical position by the weight of ball 5 and by the resiliency of diaphragm 11. Helical springs 21 and 25 acting on disks 6 and 7 also exert a force which opposes the wind force and which tends to urge the rod towards its vertical position as well as to insure a firm contact between the disks and the rings 9 and segments 10.

In the preferred embodiment shown in Figs. 1, 2 and 5, the vane 5 is ball shaped. Such a shape presents the same effective area to the wind at all angles of tilt of rod 4. Other shapes may be used whose effective area changes with the tilting of rod 4. Wind pressure increases approximately logarithmically with wind velocity so that a rod having a ball-shaped vane tips more for equal increments of velocity increase at the higher wind velocities. A wind vane such as that shown in Fig. 7 may be used to compensate for the logarithmic increase in wind pressure. Vane 5a is a circular cylinder. The effective cylinder length exposed to the wind when the rod is approximately vertical is shown as A. When the cylinder is tipped by the wind, the effective length decreases, as shown, to B with a decrease of D. The decrease in effective length, i. e. area, as the width is constant, compensates for the logarithmic increase in wind pressure allowing rings 9 to be more evenly spaced. Other vane shapes may be used to provide more or less compensation as desired.

*Wiring and indicator element*

Figure 6:
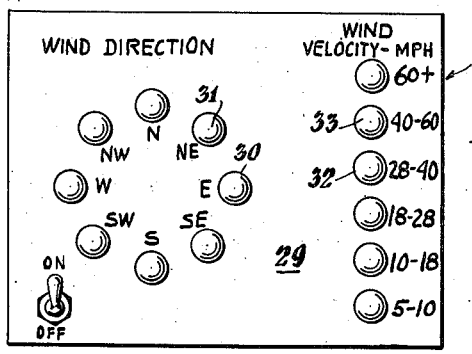
Fig. 6 is a front elevational view of the indicating element.

A preferred embodiment of the indicator element 28 is shown in Fig. 6. This comprises a suitable panel 29 with lamps 31 mounted thereon behind circularly spaced perforations 30 to indicate wind directions and lamps 33 mounted in a vertical line behind perforations 32 to indicate wind velocities. At any given wind direction and velocity one lamp 31 and one lamp 33 will be lighted.

The electrical circuit for the sensing element 1 and the indicating element 28 is shown in Fig. 5. A cable 27 connects the indicating element 28 located at a convenient viewing location and the sensing element 1 mounted in a position exposed to the wind.

Wires 34 of the cable 27 connect each ring 9 to one side of a wind velocity indicator lamp 33. The other sides of lamps 33 are connected together and to a source of voltage 45 through current limiting resistor 37. The circuit is completed by connecting conducting disk 6 to the opposite side of the voltage source 45 through lead wire 36. Thus when disk 6 contacts a ring 9, voltage appears across a corresponding and appropriately labeled lamp 33 igniting it and giving an indication of the rod tilt or wind velocity. A suitable off-on switch 44 is placed in series in the line.

Direction indicating segments 10 are similarly each connected to one direction indicating lamp 31 by wires 35 of cable 27. The other sides of lamps 31 are connected through a current limiting resistor 38 and switch 44 to voltage source 45. The circuit is completed by wire 36 which connects disk 7 to voltage source 45. Thus with switch 44 closed, voltage will appear across a lamp 31 connected to the segment 10 with which disk 7 is in contact.

Voltage source 45 may be either A. C. or D. C. It is preferable when A. C. is used, to place a rectifier 40 in the line to rectify the current. This prevents the capacity between cable wires, contact rings and segments from acting as short circuiting paths and causing interference between the various circuits. A conventional filter comprising resistors 41 and 42 and capacitor 39 is used with rectifier 40 which may be a selenium rectifier or any other of the known rectifiers. One convenient source of voltage for the wind indicator is the standard 115 volt A. C. service. Other sources such as small high voltage batteries commonly used as radio "B" batteries are also suitable.

The lamps 31 and 33 are preferably glow discharge type lamps such as low wattage neon lamps having a pair of electrodes between which a luminous electrical discharge is maintained. These lamps have several advantages, as they operate at low currents of a few milliamperes, low power and high voltage. The low current results in long contact life, since contact sparking and heating are eliminated. The high voltage allows good initial contact between the disks and the low power consumption assures inexpensive operation and long life for battery installations. Other types of lamps such as incandescent lamps may be used, but they are not as desirable due to their relatively high current requirements.

*Operation*

The sensing element 1 is mounted in a position exposed to the wind and is connected by cable 27 to indicating element 28 which is mounted in a convenient observation position. In the illustrated embodiment of the wind indicator, rod 4 stands in an upright position in the absence of wind. Neither disk 6 nor disk 10 then make contact so that no indicator lamps glow on indicating element 28, thus informing the observer that there is no wind. If desired, a ring 9 could be positioned on support 17 to contact disk 6 at the zero wind position to illuminate an appropriately labeled lamp indicating that there is no wind.

Fig. 2 shows the sensing element under the influence of a forty to sixty-mile-per-hour wind. The pressure of this wind on ball 5 has tipped rod 4 so that disk 6 has slid outwardly to contact the fifth ring 9. This ring is connected to a lamp 33 on indicator element 28 appropriately labeled which is illuminated as previously described by disk 6 closing the electrical circuit. Simultaneously disk 7 has been tipped into contact with a segment 10 connected, for example, to an indicator lamp 31 labeled NE to cause the electrical circuit to illuminate the lamp and to indicate a NE wind.

In order that a signal is always given when a wind is blowing, disks 6 and 7 have their edges shaped so that they will always contact at least one ring or segment. To assure this, the contact area of the disks is made slightly wider than the distance between the rings or the segments. Thus it is possible for the disks to be contacting either two rings or two segments simultaneously. The electrical circuit is designed to allow only one velocity lamp and one direction lamp to light at a time when glow lamps are used. This feature operates as follows. When the rod 4 is upright, the glow lamps will initially be extinguished. As no current is flowing, the full voltage will appear across a glow lamp when the disks touch its associated ring or segment, igniting it. Current will then flow through the circuit, including current limiting resistor 37 or 38. These resistors are given a high enough value to drop the voltage across the glow lamp to a voltage high enough to allow it to remain ignited but low enough to prevent ignition of a second lamp. It is a characteristic of glow discharge lamps that a higher voltage is required for ignition than to maintain ignition once started. Thus, if the disks now slide into contact with a second ring or segment placing voltage across a second lamp, there will not be enough voltage to ignite the second lamp until the disk clears the first ring or segment, allowing the first lamp to be extinguished and the current to flow across resistor 37 or 38 interrupted.

It is possible that the wind direction disk 7 might be tipped into contact with two segments 10 simultaneously. In this case full voltage will momentarily appear across two glow lamps. Due to the inherent difference in the ignition rates of any two lamps, one will ignite first, causing a voltage drop in resistor 38 which will then prevent ignition of the second lamp.

In cases where there is no objection to having two adjacent lamps lighted, the value of resistors 37 and 38 may be reduced to prevent the voltage drop across them from being enough to prevent the ignition of the second lamp.

It will be seen that the present invention provides an improved wind direction and velocity indicator. The indicator has an improved mechanical design which provides for low pressure, long wearing contacts and also provides for a sealed construction whereby the contact members are easily and effectively sealed off from dirt or moisture. The mechanical construction is also rugged and relatively simple, having a minimum number of parts so that it is easily manufactured and is also relatively inexpensive. An electrical circuit is disclosed to provide visual indications of the wind direction and velocity at a remote point. This circuit is particularly adapted to this contact type of indicator and assures long contact life through the use of low currents. The circuit also provides a novel arrangement to assure that one indicator lamp is always ignited when the wind is blowing but which prevents two adjacent lights from being on simultaneously.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described our invention, we claim:

1. In a wind direction and velocity indicator, the combination of a rod mounted on a universal pivot to tilt from a normal vertical position in accordance with the wind direction and velocity, a wind resistance member attached to one end of said rod to provide an area of resistance to the wind to tip said rod, a first conductor disk floatingly and resiliently mounted concentrically to said rod in a position normal to said rod, a plurality of concentric conductive rings in a horizontal plane and surrounding said rod and adjacent to said disk whereby said disk contacts said rings in accordance with its degree of tilt to close electric circuits associated with said rings to give an indication of wind velocity, a second conductor disk floatingly and resiliently mounted concentrically to said rod in a position normal thereto and spaced from said first disk, and a plurality of radially oriented contact segments in a horizontal plane and electrically insulated from one another surrounding said rod adjacent to said second disk whereby said second disk contacts said segments in accordance with the direction in which said rod is tipped to close electric circuits associated with the segments to give an indication of wind direction.

2. In a wind indicator, the combination of a rod mounted medially of its length by a resilient universal pivot in a normally vertical position, a wind resistance member at the lower end of said rod whose surface provides resistance to a wind force to tilt the rod an amount proportional to the wind, a conductive disk with a perforated center on the upper portion of said rod having the rod passing through said perforation and being held generally normally to said rod between a resilient member and a flange on said rod, a plurality of stationary concentric contact rings around said rod in a plane normal thereto and adjacent to said disk whereby the outer edge of said disk is brought into contact with said rings consecutively as said rod is tipped by an increasing wind force on said wind resistance member to close electric indicating circuits associated with said contact rings.

3. In a wind indicator, the combination of a rod mounted medially of its length by a universal pivot in a normally vertical position, a wind resistance member at the lower end of said rod whose surface provides resistance to the wind to tilt said rod in a direction corresponding to the wind direction, a conductive disk with a perforated center on the upper portion of said rod having the rod passing through said perforation and being held generally normal to said rod between a resilient member and a flange member on said rod, a plurality of stationary radially oriented conductor segments around said rod in a plane normal thereto and adjacent to said disk whereby the outer edge of said disk is brought into contact with one or two of said segments in accordance with the direction in which said rod is tipped by the wind to close electric indicating circuits associated with said segments.

4. In a wind indicator, the combination of a sensing element having a universally pivoted vane member at least partially exposed to the wind and a remotely located indicator element for providing a visual indication of the vane position, said sensing element comprising a plurality of spaced electrical contact members adjacent to the vane and a brush mounted on the vane so as to contact one or more of said contact members in accordance with the position of said pivoted vane, said indicator element comprising a plurality of gaseous-discharge lamps, one electrode of each lamp connected to one of said spaced contact members, and the second electrodes of said lamps connected together and adapted to be connected to a serially connected resistor and source of voltage, whereby when the resistor and the source of voltage are connected between said brush and said second electrodes one of said lamps is ignited when said brush contacts the spaced electrical contact connected to its first electrode to thereby indicate the position of the vane and whereby when one of said lamps is ignited the resistor will drop the voltage across the other lamps to a value below voltage required to ignite said other lamps.

5. In a wind indicator, the combination of a sensing element having a universally pivoted vane member at least partially exposed to the wind and a remotely located indicator element for providing a visual indication of the vane position, said sensing element comprising a plurality of spaced electrical contact members adjacent to the vane and a brush mounted on the vane so as to contact one or more of said contact members in accordance with the position of said pivoted vane, said indicator element comprising a plurality of gaseous-discharge lamps, one electrode of each lamp connected to one of said spaced contact members, the second electrodes of said lamps connected together and to a resistor and adapted to be connected to a source of voltage through said resistor whereby when a source of voltage is connected between said brush and said resistor one of said lamps is ignited when said brush contacts the spaced electrical contact connected to its electrode to thereby indicate the position of the vane and whereby the voltage drop across said resistor due to the current flow through said ignited lamp prevents the ignition of a second lamp when said brush engages a second spaced contact while still engaging the first brush contacted.

6. In a wind indicator, the combination of a sensing element and a remotely located indicator element for providing a visual indication of the vane position, said sensing element comprising a universally pivoted vane, a first set of spaced electrical contacts arranged with increasing distances from said vane, a first brush on said vane in sliding contact with said spaced contacts whereby it makes contact with one or more successively more distant adjacent contacts as said pivoted vane tips due to wind pressure thereon, a second set of spaced contacts radially oriented about said vane, a second brush on said vane whereby it contacts one or more of said radially oriented contacts in accordance with the direction in which said vane is tipped, said indicating member comprising a first set of gaseous-discharge lamps, one electrode of each lamp connected to one of the contacts in the first set of contacts, the second electrodes of said lamps connected together and adapted for connection to a source of voltage whereby when a source of voltage is connected between said first brush and said second electrodes one of said first set of lamps is ignited when said first brush contacts the electrical contact connected to its first electrode to give an indication of the wind velocity, a second set of gaseous-discharge lamps, one electrode of each lamp connected to one of said contacts of said second set of contacts and the second electrodes of said second set of lamps connected together and adapted for connection to a source of voltage whereby when a source of voltage is connected between said second brush and the second electrodes of said second set of lamps one of said second set of lamps is ignited to give an indication of the wind direction.

7. In a wind indicator, the combination of a plurality of concentric contact rings, a rod mounted on a universal pivot in a normally vertical position and extending through the innermost of said rings, a wind resistance member at one end of said rod to provide resistance to the wind and to tilt the rod an amount proportional to the wind velocity, a conductive disk member mounted on said rod in a position generally normal to the rod, said disk member being adjacent to said contact rings whereby said disk is moved into contact with said rings as said rod is tilted by a wind force.

8. The device as claimed in claim 7, wherein said conductive disk has a central opening therein through which said rod passes and wherein said disk is mounted on said rod between a resilient member and a flange member.

References Cited in the file of this patent

UNITED STATES PATENTS

| | | |
|---|---|---|
| 2,287,612 | Hardin | June 23, 1942 |
| 2,522,796 | Olsen | Sept. 19, 1950 |
| 2,607,891 | Townsend | Aug. 19, 1952 |
| 2,611,051 | Kolff | Sept. 16, 1952 |
| 2,630,550 | Geohegan | Mar. 3, 1953 |
| 2,665,583 | Anjanos | Jan. 12, 1954 |

FOREIGN PATENTS

| | | |
|---|---|---|
| 354,000 | Great Britain | Aug. 6, 1931 |